US006697308B1

(12) United States Patent
Tran

(10) Patent No.: US 6,697,308 B1
(45) Date of Patent: Feb. 24, 2004

(54) METHOD AND SYSTEM FOR PROVIDING TIMING ADJUSTMENT TO PERFORM RELIABLE OPTICAL RECORDING AT HIGH SPEEDS

(75) Inventor: Paul Phuc Thanh Tran, Milpitas, CA (US)

(73) Assignee: Mosel Vitelic Corporation, San Jose, CA (US)

(*) Notice: Subject to any disclaimer, the term of this patent is extended or adjusted under 35 U.S.C. 154(b) by 0 days.

(21) Appl. No.: 09/560,877

(22) Filed: Apr. 28, 2000

(51) Int. Cl.$^7$ ................................................ G11B 5/09
(52) U.S. Cl. ................................ 369/47.28; 369/59.12; 369/47.5
(58) Field of Search .................... 369/44.31, 47.28, 369/47.5, 47.53, 47.51, 47.19, 47.32, 47.46, 47.31, 53.34, 59.11, 59.12, 59.13, 59.21, 59.22, 59.23, 116, 124.07, 124.04, 124.05, 44.32

(56) References Cited

U.S. PATENT DOCUMENTS

| | | | |
|---|---|---|---|
| 4,621,351 A | 11/1986 | Baer et al. ..................... 369/44 |
| 4,695,994 A | 9/1987 | Steenbergen et al. .......... 369/54 |
| 4,734,900 A | 3/1988 | Davie ............................ 369/59 |
| 4,873,680 A | 10/1989 | Chung et al. ................... 369/59 |
| 4,998,237 A * | 3/1991 | Osakabe et al. ........ 369/109.01 |
| 5,043,971 A * | 8/1991 | Van et al. .................. 369/59.12 |
| 5,070,495 A | 12/1991 | Bletscher, Jr. et al. ....... 369/116 |
| 5,291,471 A | 3/1994 | Russell ......................... 369/100 |
| 5,436,880 A | 7/1995 | Eastman et al. ............... 369/54 |
| 5,446,716 A | 8/1995 | Eastman et al. ............... 369/54 |
| 5,537,578 A | 7/1996 | Day, III et al. .............. 395/492 |
| 5,675,568 A | 10/1997 | Hajjar et al. ................. 369/116 |
| 5,796,703 A | 8/1998 | Schell et al. ................. 369/116 |
| 5,875,158 A | 2/1999 | Schell ....................... 369/44.34 |
| 5,878,015 A | 3/1999 | Schell et al. ................. 369/116 |
| 6,160,784 A * | 12/2000 | Maeda et al. ................ 369/116 |
| 6,269,060 B1 * | 7/2001 | Harvey et al. ............ 369/47.28 |
| 6,445,661 B1 * | 9/2002 | Wu ............................. 369/59.2 |

* cited by examiner

Primary Examiner—Thang V. Tran
Assistant Examiner—Bach Vuong
(74) Attorney, Agent, or Firm—Sawyer Law Group LLP

(57) ABSTRACT

The present invention provides a method and system for providing timing adjustments to perform reliable optical recording at high speeds. The present invention includes performing a timing adjustment in a coarse increment to a write control signal using a clock with a cycle less than T, where T is a fundamental unit of time for a data mark; and performing a timing adjustment in a fine increment to the write control signal using a time delay technique. The method and system in accordance with the present invention provides a write control logic which allows for multiple levels of time adjustment for each type of mark. In the preferred embodiment, a dual level timing adjustment technique is provided. The first level provides coarse timing adjustments using a clock with a cycle less than T and parameters to control the power level and time duration of each mark. The second level provides fine timing adjustments using time delay techniques. By using the first and second levels of adjustments together, fine adjustments are provided without the need for expensive fast clocks. The method and system in accordance with the present invention thus allows for the writing of data at high speeds without compromising data reliability and without increasing the cost of manufacturing the optical drive.

25 Claims, 7 Drawing Sheets

Write Control Level 1
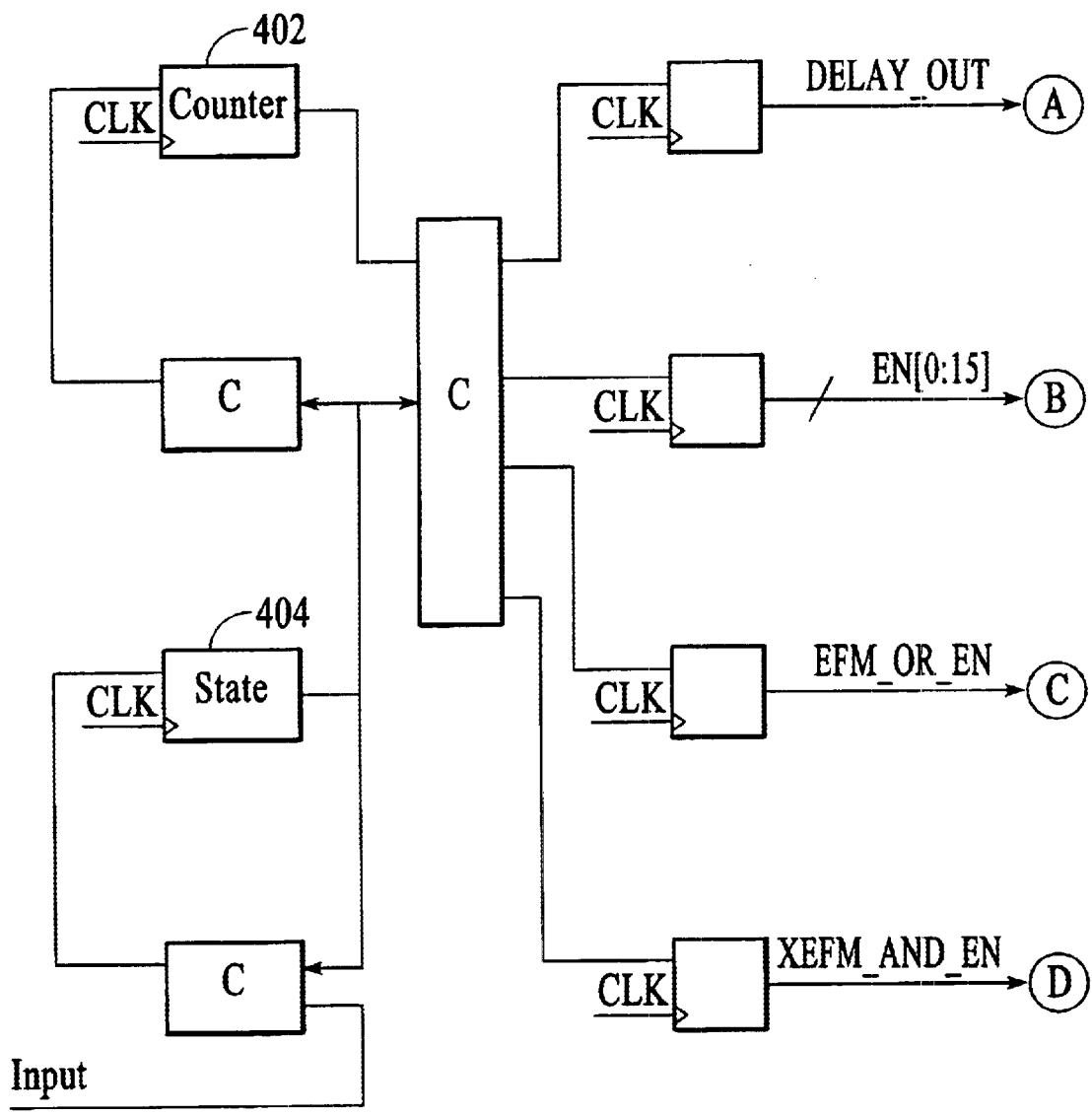
FIG. 4/1

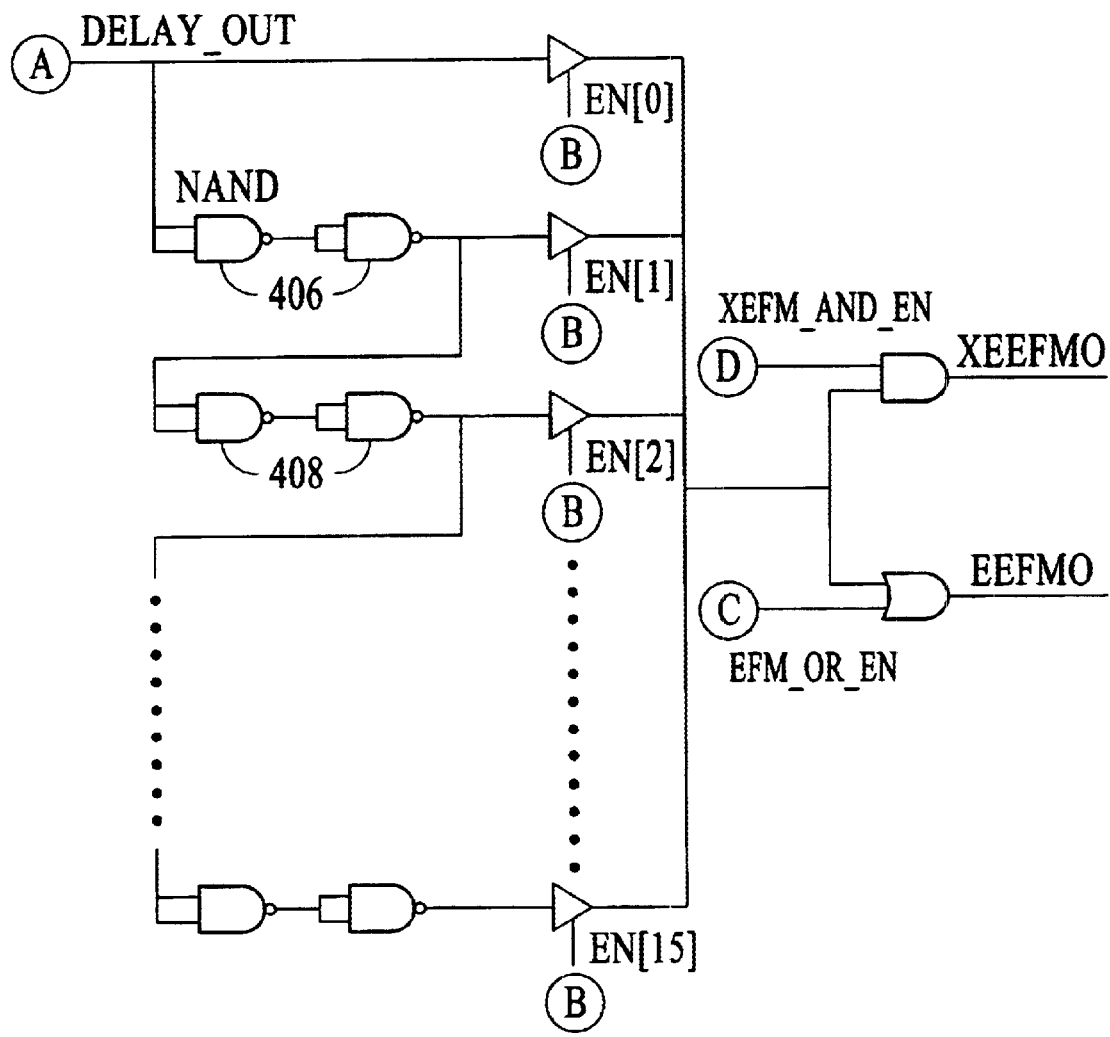
FIG. 4/2

METHOD AND SYSTEM FOR PROVIDING TIMING ADJUSTMENT TO PERFORM RELIABLE OPTICAL RECORDING AT HIGH SPEEDS

FIELD OF THE INVENTION

The present invention relates to optical media, and more particularly to recording data on optical media.

BACKGROUND OF THE INVENTION

Optical drives capable of recording data on optical media are well known in the art. These drives include the Compact Disc-Read/Write (CD-R) drives, which can read CD-based formats and read and write to Write Once Media, and Compact Disc-Rewritable (CD-RW) drives, which can read CD-based formats and read and write to Write Once Media and Rewritable Media. The standard CD recordable and rewritable media and format is set forth in what is commonly referred to in the art as the "orange book". Under the standard, the writing of data is described in terms of "T", where T is a fundamental unit of time, and has a minimum mark of 3T and a maximum mark of 11T. The length of T is determined by the speed of the clock, where with a 1× optical drive, T=231 ns. The writing of the 3T mark is the most critical due to its size, thus the standard sets forth when to heat and cool the recording material in writing the 3T mark. A Non-Return to Zero Inverted (NRZI) method of recording is used, where a zero is represented by a change in the write control signal and a one by no change. When the write control signal first changes, the heating of the media begins. When the write control signal changes again, the heating ends, and the media is cooled to end the mark. When the media is heated and cooled to form a 3T mark varies with the type of media, and is set by the standard. However, the precision of the standard may be inadequate for higher recording speeds, such as 5× or up. At these higher recording speeds, T becomes smaller, thus the writing must be more accurate to avoid compromising the reliability of the data. As the recording speed increases, the heating up and cooling time shrinking of the recording media causes different effects as the data goes from one type of mark into another type of space and vice versa. This causes the unreliable formation of mark and space lengths, especially when the recording media varies from one manufacturer to another.

One conventional method of increasing the writing accuracy is to fine tune the write control by using a faster clock. By using a clock with a cycle less than T, adjustments may be made at increments equal to a cycle of the clock while maintaining T at the same length. The faster the clock, the finer the adjustments. However, at the faster recording speeds, the required clocks would need to be very fast. Such fast clocks are very expensive, and their use increases the cost of manufacturing the optical drive.

Accordingly, there exists a need for a method and system for providing timing adjustment to perform reliable optical recording at high speeds. The method and system should avoid the need to have an expensive fast clock, thus avoiding an increase in the cost of manufacturing the optical drive. The present invention addresses such a need.

SUMMARY OF THE INVENTION

The present invention provides a method and system for providing timing adjustments to perform reliable optical recording at high speeds. The present invention includes performing a timing adjustment in a coarse increment to a write control signal using a clock with a cycle less than T, where T is a fundamental unit of time for a data mark; and performing a timing adjustment in a fine increment to the write control signal using a time delay technique. The method and system in accordance with the present invention provides a write control logic which allows for multiple levels of time adjustment for each type of mark. In the preferred embodiment, a dual level timing adjustment technique is provided. The first level provides coarse timing adjustments using a clock with a cycle less than T and parameters to control the power level and time duration of each mark. The second level provides fine timing adjustments using time delay techniques. By using the first and second levels of adjustments together, fine adjustments are provided without the need for expensive fast clocks. The method and system in accordance with the present invention thus allows for the writing of data at high speeds without compromising data reliability and without increasing the cost of manufacturing the optical drive.

BRIEF DESCRIPTION OF THE FIGURES

FIG. 4 is a circuit diagram illustrating a preferred embodiment for performing, coarse and fine timing adjustments of the write control logic in accordance with the present invention.

DETAILED DESCRIPTION

The present invention provides a method and system for providing timing adjustment to perform reliable optical recording at high speeds. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention provides a write control logic which allows for multiple levels of time adjustment for each type of mark. In the preferred embodiment, a dual level timing adjustment technique is provided. The first level provides coarse timing adjustments using a programmable clock with a cycle less than T and parameters to control the power level and time duration of each mark. The second level provides fine timing adjustments using time delay techniques. By using the first and second levels of adjustments together, fine adjustments are provided without the need for expensive fast clocks. The method and system in accordance with the present invention thus allows for the writing of data at high speeds without compromising data reliability and without increasing the cost of manufacturing the optical drive.

Figure 1:
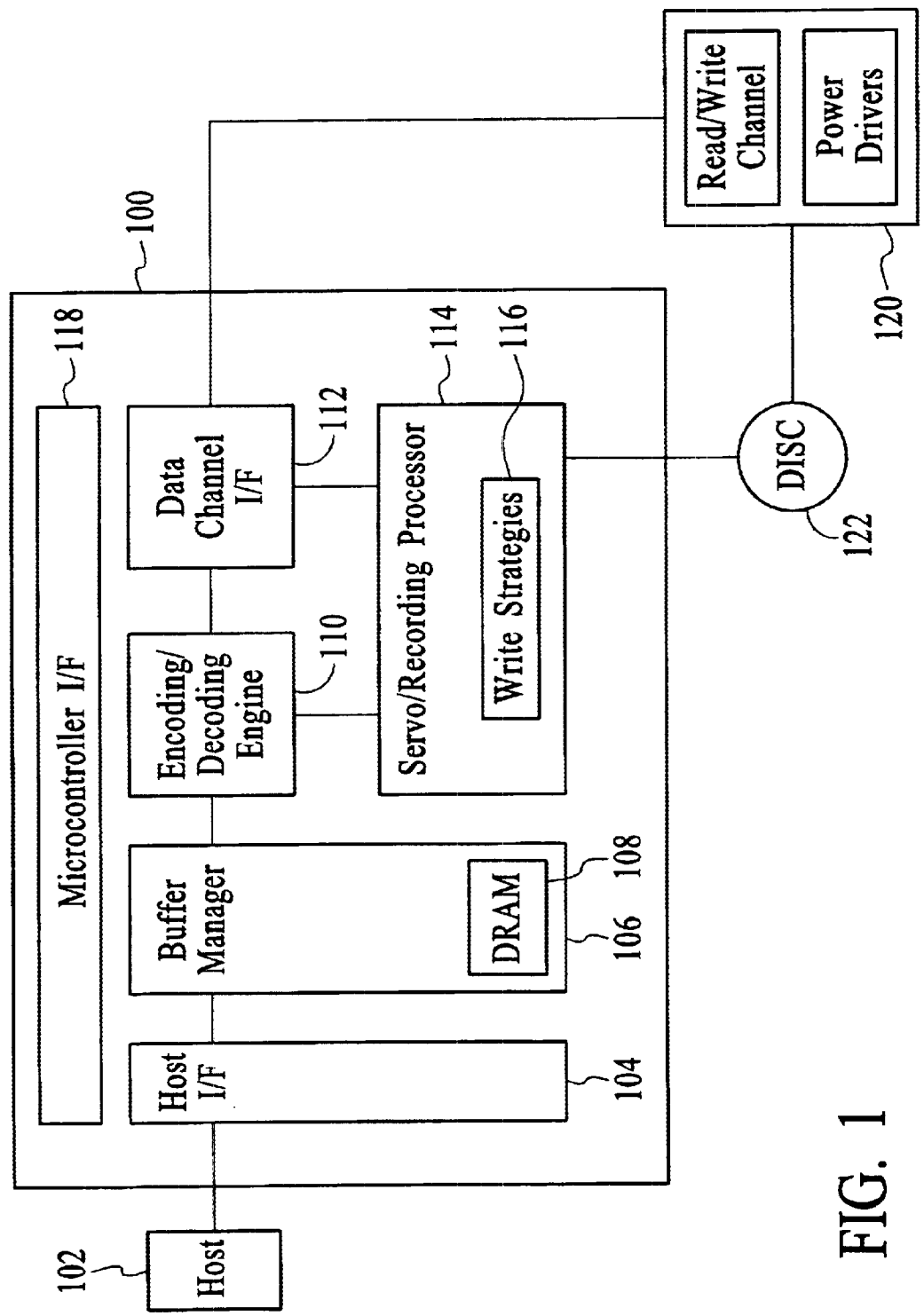
FIG. 1 is a block diagram illustrating a preferred embodiment of a controller which may use the method and system in accordance with the present invention.

To more particularly describe the features of the present invention, please refer to FIGS. 1 through 6 in conjunction with the discussion below;

FIG. 1 is a block diagram illustrating a preferred embodiment of a controller which may use the method and system in accordance with the present invention. The elements 104–118 represent the logical architecture of the controller 100. The controller 100 comprises a host interface 104, a buffer manager 106 with an embedded memory 108, an integrated encoding/decoding engine 110, a data channel interface 112, an integrated servo/recording processor 114 embedded with the write strategies 116, and a microcontroller interface 118. In the preferred embodiment, the embedded memory 108 is an embedded dynamic random access memory (DRAM). The integrated servo/recording processor 114 provides the mechanical control of the disc 120 and the spindle and sledge (not shown) of the drive for both reading and writing of data. The servo/recording processor 114 interfaces with the disc 122 in the writing of data. Integrated into the processor 114 are the write strategies 116 which controls the writing of the data so that the data is in a standard format. The write control logic in accordance with the present invention would be part of the servo/recording processor 114 for controller 100. The controller 100 is further described in co-pending U.S. Patent Application entitled "Integrated Controller To Process Both Optical Reads And Optical Writes Of Multiple Optical Media", Ser. No. 09/652,254, filed on Aug. 30, 2000 Applicant hereby incorporates this patent application by reference.

Figure 2:
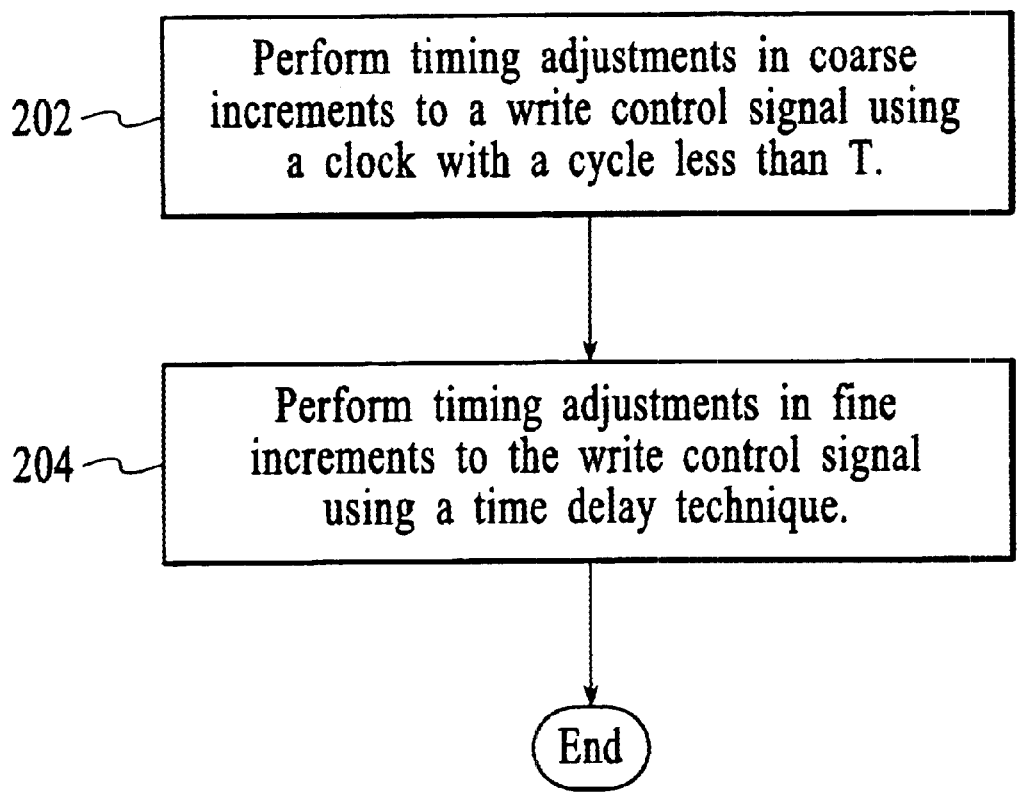
FIG. 2 is a flow chart illustrating a preferred embodiment of a method for providing timing adjustment in accordance with the present invention.

FIG. 2 is a flow chart illustrating a preferred embodiment of a method for providing timing adjustments in accordance with the present invention. First, timing adjustments in coarse increments are performed to a write control signal using a programmable clock with a cycle less than T, via step 202. The value of the clock cycle is programmable to any fractional value of T. In the preferred embodiment, the coarse increments are organized in 0.25T steps, where each step is accurately controlled using the 0.25T clock. The preferred embodiment uses programmable write control parameters to perform the coarse adjustments. The programmable write control parameters are described further below. Next, timing adjustments in fine increments are performed to the write control signal using a time delay technique, via step 204. In the preferred embodiment, the fine increments are provided by a 2-input NAND gate delay, ranging from 0 to 61 gates, where each delay stage corresponds to two gates. This delay is added to the coarse timing adjustments to fine tune each edge, leading and trailing, of the pulses of the write control signal. Thus, the coarse timing adjustments provide a first level, of adjustments while the fine timing adjustments provide a second level of adjustments.

With the present invention, only the first level, coarse timing adjustments require a clock with a cycle less than T. The fine timing adjustments do not. This clock only need to be fast enough to support the coarse increments and need not be so fast as to support the fine increments. This is in contrast to the conventional method where a clock with a cycle equal to the length of the fine increments would be required. This fast clock is significantly more expensive than the clock used for the coarse increments Thus, with the method and system in accordance with the present invention, the need for an expensive fast clock is avoided while still accomplishing the analogous level of timing adjustments to the write control signal. Also, the cycle of the clock for the coarse timing adjustments is programmable, thus adding flexibility.

Figure 3:
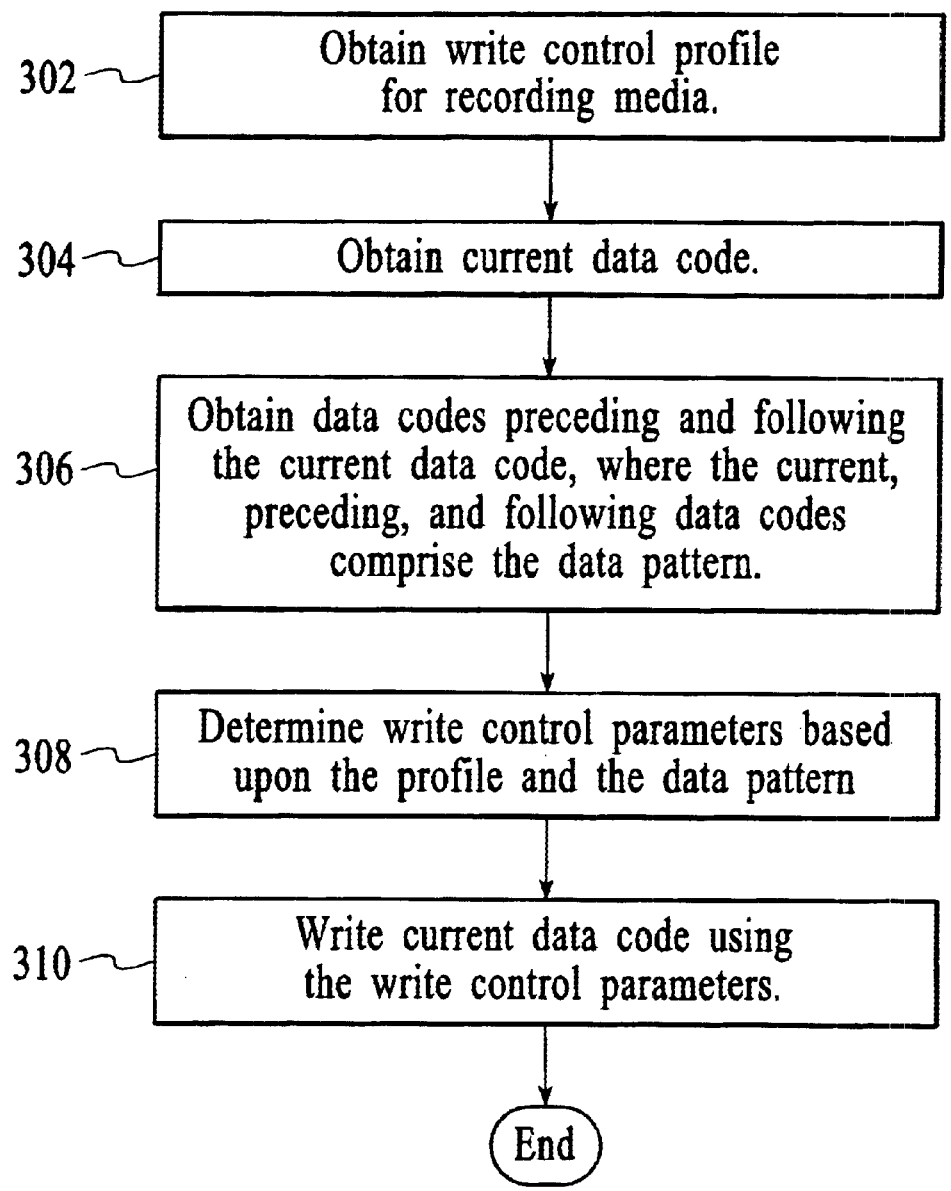
FIG. 3 is a flow chart illustrating in more detail the coarse timing adjustments of the write control logic in accordance with the present invention.

FIG. 3 is a flow chart illustrating in more detail the coarse timing adjustments of the write control logic in accordance with the present invention. Assume that the clock cycle has been programmed to some value less than T. First, a write control profile for the recording media is obtained, via step 302. Next, the current data code is obtained, via step 304. Then the data codes preceding and following the current data code is obtained, via step 306. The current, preceding, and following data codes together form the data "pattern". This pattern is important since the behavior of the recording media when the current data code is written is affected by the data codes which has been written before it and by the data code to be written after it. Next, the write control parameters for the current data code is determined based upon the profile and the data pattern, via step 308. In the preferred embodiment, the write control parameters control the power level and time duration in the writing of each mark for the data codes.

In the preferred embodiment, the write control parameters are programmable to be different for each mark. The profile is also programmable. After writing a number of data codes, the write control logic will read the newly written data to determine the quality of the data. The profile can then be adjusted so that a high quality is maintained. This is important since the behavior of the recording media changes as the temperature of the drive, the temperature of the room, the humidity, etc. changes. Different media also have variations in its characteristics from disc to disc, even from manufacturer to manufacturer. This adjusted profile can be saved for future use. The adjusted profile then affects the write control parameters for subsequent writings. The programmable write control parameters are disclosed in co-pending U.S. Patent Application entitled "Method And System For Mark and Space Adjustment To Perform Reliable Optical Recording At High Speeds", Ser. No. 09/542,627, filed on Apr. 4, 2000 Applicant hereby incorporates this Patent Application by reference.

FIG. 4 is a logical circuit diagram illustrating a preferred embodiment for performing coarse and fine timing adjustments of the write control logic in accordance with the present invention. The coarse adjustments are based upon the cycle of the clock signal (CLK). The counter 402 counts the number of clock cycles which passes, so that the number of T's that has passed is tracked. The state 404 provides the adjustments according to the write control parameters. In the preferred embodiment, the state is programmed to adjust in 0.25T increments. The signals, EFM_OR_EN and XEFM_AND_EN, is output as shown. Any fine adjustments are provided by the DELAY_OUT signal. The amount of the delay in the fine adjustments is controlled by the enable signals EN [0:15]. If no fine adjustment is desired, then only the EN[0] signal is enabled, and the DELAY_OUT signal is not affected by any NAND gates. If one increment is desired, then the EN[1] signal is enabled, directing the DELAY OUT signal to pass through one stage of 2-NAND gates 406. If two increments is desired, then the EN[2] signal is enabled, directing the DELAY_OUT signal to pass through two stages of 2-NAND gates 406 and 408. In the preferred embodiment, up to fifteen stages of 2-NAND gates are possible, but any number of NAND gates may be used without departing from the spirit and scope of the present invention. The resulting DELAY_OUT signal is then logically AND'ed with the XEFM_AND_EN signal and logically OR'ed with the EFM_OR_EN signal from the coarse adjustment. The final signals, XEEFMO and EEFMO, control the leading and falling edges of the mark and is output with both the coarse adjustments and the fine adjustments.

Figure 5:
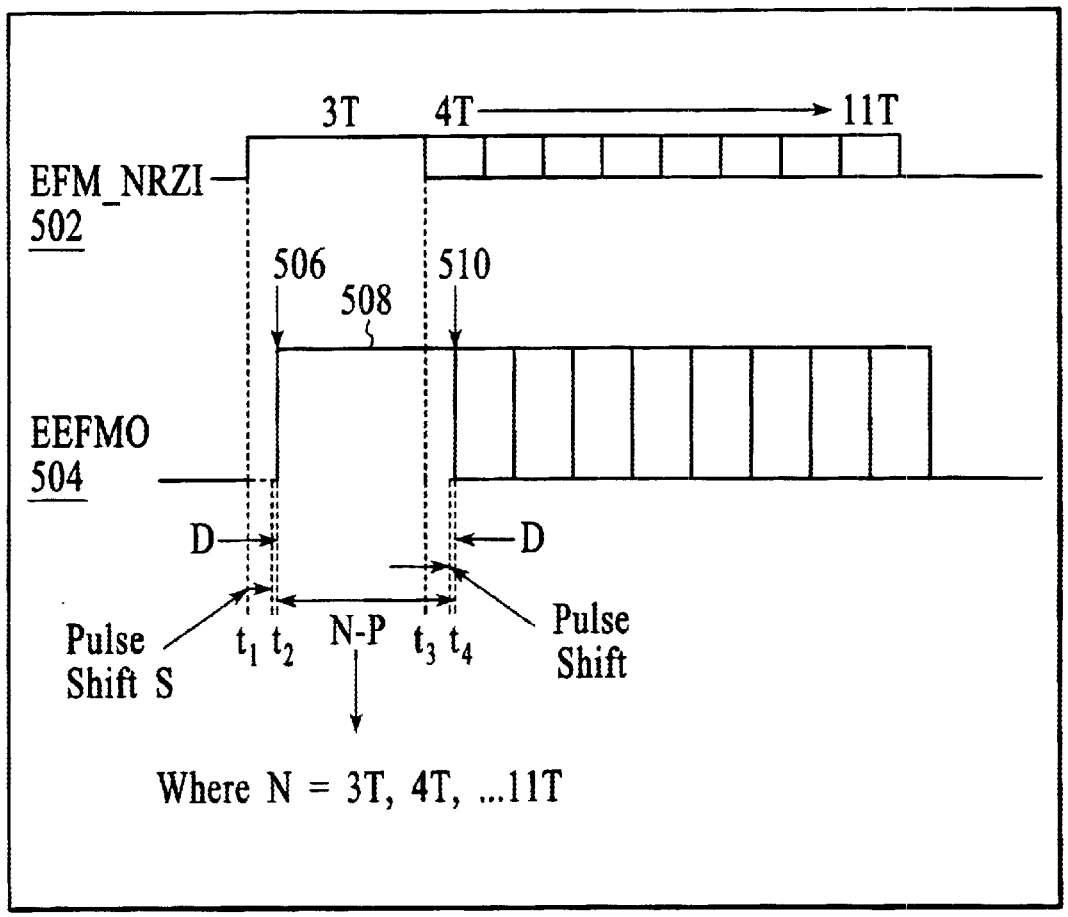
FIG. 5 is a diagram illustrating the use of the write control logic for a length mode recording method in accordance with the present invention.
Figure 6:
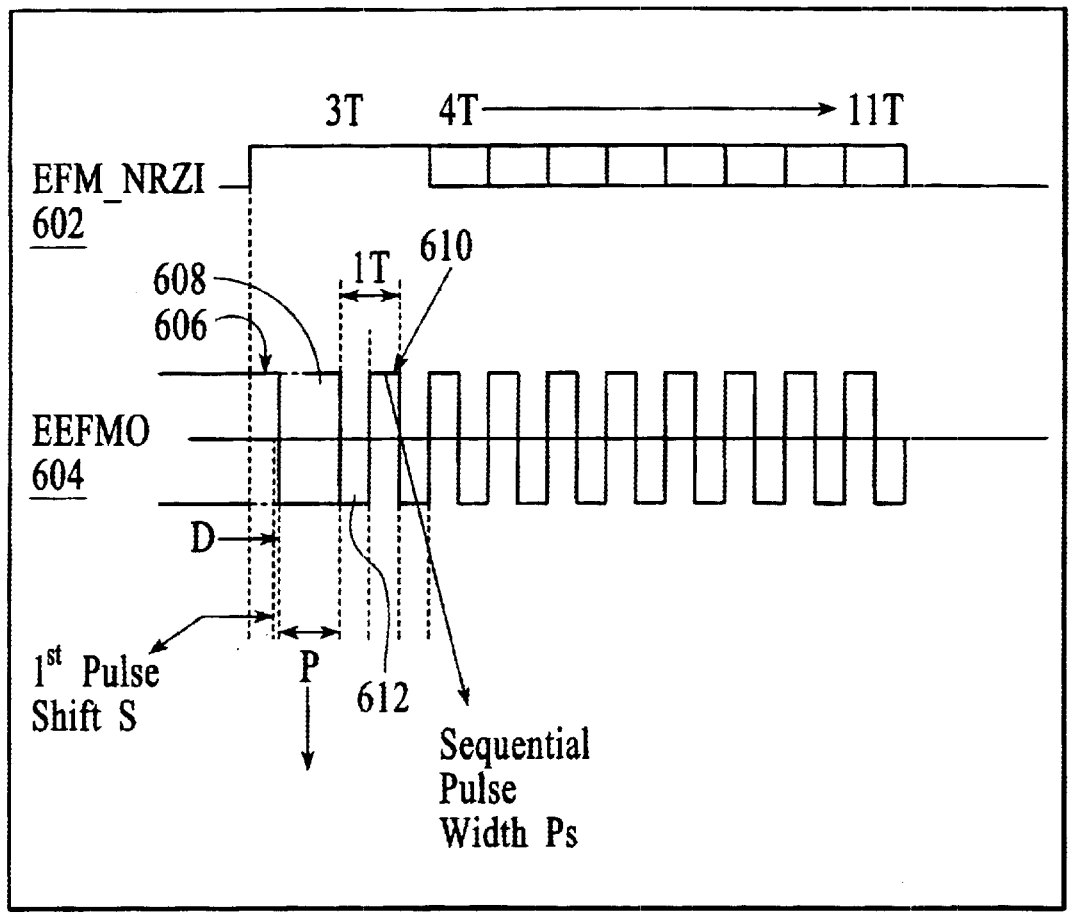
FIG. 6 is a diagram illustrating the use of the write control logic for a pulse mode recording method in accordance with the present invention.

FIGS. 5 and 6 are diagrams illustrating the application of the write control logic in accordance with the present invention in two recording methods. Currently in the art, the two recording methods primarily used are length mode recording and pulse mode recording. The length mode recording method is typically used with CD-Recordable, Write Once media. The pulse mode recording method is typically used with CD-Read/Write media. Both methods are well known in the art.

FIG. 5 is a diagram illustrating the use of the write control logic for a length mode recording method in accordance with the present invention. In the diagram, the NRZI write control signal 502 is illustrated at the top of the diagram. Assume that a current data code of 3T is to be written. Based upon the coarse and fine timing adjustments, the NRZI write control signal 502 is changed to the adjusted write control signal 504.

In the coarse timing adjustments, via step 202, the width of the pulse 508 is adjusted based on a pulse width parameter, P. The adjusted pulse width is represented by "N–P", where N=3T, 4T, . . . 11T. The pulse 508 may also be shifted by S, where S is the pulse shift parameter.

In the fine timing adjustments, via step 204, the rising edge 506 an d falling edge 510 may be further shifted by D, using a time delay technique, such as that illustrated in FIG. 4. In this example, the P and S parameters together cause the rising edge 506 of pulse 508 to occur at time $t_2$, although the rising edge of the NRZI write control signal 502 begins at $t_1$. By the same token, the P and S parameters together cause the trailing edge 510 of pulse 508 to occur at time $t_4$, although the rising edge of the NRZI write control signal 502 falls at $t_3$. The 3T data code may then be written according to the time adjusted write control signal 504. For each of the adjustable timing parameters above, a corresponding power level can be specified and programmed prior to the writing of the data. Like the timing parameters, the power level depends upon the profile of the recording media.

FIG. 6 is a diagram illustrating the use of the write control logic for a pulse mode recording method in accordance with the present invention. In the diagram, the NRZI write control signal 602 is illustrated at the top of the diagram. Assume again that a current data code of 3T is to be written. Based upon the coarse and fine timing adjustments, the NRZI write control signal 602 is changed to the adjusted write control signal 604.

In the coarse timing adjustments, via step 202, the width of the first pulse 608 is determined by the programmable pulse width parameter, P. The pulse 608 may also be shifted by the pulse width parameter, S. The subsequent high pulse width 610 is determined by the programmable high pulse width parameter, Ps, and the low pulse width 612 is determined by the programmable low pulse width parameter, 1–Ps. A high pulse and a low pulse together represent 1T.

In the fine timing adjustments, via step 204, the rising edge 606 and falling edge 610 of the first pulse 608 may be further shifted by D, using a time delay technique, such as that illustrated in FIG. 4. The 3T data code may then be written according to the time adjusted write control signal 604. For each of the adjustable timing parameters above, a corresponding power level can be specified and programmed prior to the writing of the data. Like the timing parameters, the power level depends upon the profile of the recording media.

Although the write control logic has been described with the programmable write control parameters, one of ordinary skill in the art will understand that other techniques for providing coarse timing adjustments may be used without departing from the spirit and scope of the present invention. Although the write control logic has been described with the controller illustrated in FIG. 1, other controllers may be used with the write control logic without departing from the spirit and scope of the present invention.

A method and system for providing timing adjustments to perform reliable optical recording at high speeds has been disclosed. The method and system in accordance with the present invention provides a write control logic which allows for multiple levels of time adjustment for each type of mark. In the preferred embodiment, a dual level timing adjustment technique is provided. The first level provides coarse timing adjustments using a clock with a cycle less than T and parameters to control the power level and, time duration of each mark. The second level provides fine timing adjustments using time delay techniques. By using the first and second levels of adjustments together, fine adjustments are provided without the need for expensive fast clocks. The method and system in accordance with the present invention thus allows for the writing of data at high speeds without compromising data reliability and without increasing the cost of manufacturing the optical drive.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for performing timing adjustments in optical recording, comprising the steps of:
   (a) performing a timing adjustment in a coarse increment to a write control signal using a clock with a cycle less than T, wherein T is a fundamental unit of time for a data mark, wherein the performing step (a) comprises:
   (a1) obtaining a write control profile for a recording media,
   (a2) obtaining a data pattern; and
   (a3) determining a plurality of write control parameters based upon the write control profile and the data pattern; and
   (b) performing a timing adjustment in a fine increment to the write control signal using a time delay technique.

2. The method of claim 1, wherein the cycle is programmable.

3. The method of claims 1, wherein the obtaining step (a2) comprises:
   (a2i) obtaining a current data code; and
   (a2ii) obtaining a preceding data code and a following data code, wherein the preceding, current, and following data codes comprise the data pattern.

4. The method of claims 1, wherein for a length mode recording method, the write control parameters comprise:
   a pulse width parameter; and
   a pulse shift parameter.

5. The method of claims 1, wherein for a pulse mode recording method, the write control parameters comprise:
   a first pulse width parameter;
   a first pulse shift parameter;

a high pulse width parameter; and a low pulse width parameter.

6. The method of claim 1, wherein the time delay technique comprises a multi-stage 2-input NAND gate delay circuit.

7. The method of claim 1, further comprising:
   (c) writing a data code onto a recording media according to the timing adjustments in the coarse and fine increments,
   (d) determining a quality of the writing of the data code; and
   (e) adjusting a write control profile of the recording media based upon the quality.

8. A system for optical recording, comprising:
   an apparatus for writing data onto an optical recording media; and
   a controller coupled to the apparatus, the controller comprising a write control logic which performs a timing adjustment in a coarse increment to a write control signal using a clock with a cycle less than T, wherein T is a fundamental unit of time for data mark, and performs a timing adjustment in a fine increment to the write control signal using a time delay technique, wherein in performing the timing adjustment in the coarse increment, the controller uses programmable parameters for a power level and a time duration for each mark to adjust a mark and space, and wherein the programmable parameters comprise:
      a first pulse width parameter;
      a first pulse shift parameter;
      a high pulse width parameter; and
      a low pulse width parameter.

9. The system of claim 8, wherein the cycle is programmable.

10. The system of claim 8, wherein the programmable parameters comprise:
    a pulse width parameter; and
    a pulse shift parameter.

11. The system of claimed 8, wherein the time delay technique comprises a multi-stage 2-input NAND gate delay circuit.

12. A system for optical recording, comprising:
    an apparatus for writing data onto an optical recording media; and
    a controller coupled to the apparatus, the controller comprising a write control logic which performs a timing adjustment in a coarse increment to a write control signal using a clock with a cycle less than T, wherein T is a fundamental unit of time for data mark, and performs a timing adjustment in a fine increment to the write control signal using a time delay technique, wherein the controller further comprises:
       a host interface;
       a buffer manager coupled to the host interface;
       an embedded memory coupled to the buffer manager;
       an integrated encoding/decoding engine coupled to the buffer manager;
       a data channel interface coupled to the integrated encoding/decoding engine; and
       an integrated servo/recording processor coupled to the integrated encoding/decoding engine and the data channel interface, wherein the integrated servo/recording processor comprises a set of write strategies.

13. A method for performing timing adjustments in optical recording, comprising the steps of:
    (a) performing a timing adjustment in a coarse increment to a write control signal using a clock with a cycle less than T, wherein T is a fundamental unit of time for data mark, comprising:
       (a1) obtaining a write control profile for a recording media,
       (a2) obtaining a data pattern, and
       (a3) determining a plurality of write control parameters based upon the write control profile and the data pattern; and
    (b) performing a timing adjustment in a fine increment to the write control signal using a time delay technique.

14. The method of claim 13, wherein the cycle is programmable.

15. The method of claim 13, wherein the obtaining step (a2) comprises:
    (a2i) obtaining a current data code; and
    (a2ii) obtaining a preceding data code and a following data code, wherein the preceding, current, and following data codes comprise the data pattern.

16. The method of claim 13, herein for a length mode recording method, the write control parameters comprise:
    a pulse width parameter; and
    a pulse shift parameter.

17. The method of claim 13, wherein for a pulse mode recording method, the write control parameters comprise:
    a first pulse width parameter;
    a first pulse shift parameter;
    a high pulse width parameter; and
    a low pulse width parameter.

18. The method of claim 13, wherein the time delay technique comprises a multi-stage 2-input NAND gate delay circuit.

19. The method of claim 13, further comprising:
    (c) writing the current data code onto the recording media according to the timing adjustments in the coarse and fine increments.

20. The method of claim 19, further comprising:
    (d) determining a quality of the writing of the current data code; and
    (e) adjusting the write control profile of the recording media based upon the quality.

21. A system for optical recording, comprising:
    a means for writing data onto an optical recording media; and
    a means for controlling the writing means, comprising:
       means for performing a timing adjustment in a coarse increment to a write control signal using a clock with a cycle less than T, wherein T is a fundamental unit of time for data mark, wherein the means for performing a timing adjustment in a coarse increment comprises a plurality of programmable parameters, wherein the programmable parameters comprise:
          a first pulse width parameter;
          a first pulse shift parameter;
          a high pulse width parameter; and
          a low pulse width parameter, and
       means for performing a timing adjustment in a fine increment to the write control signal using a time delay technique.

22. The system of claim 21, wherein the cycle is programmable.

23. The system of claim 21, wherein the programmable parameters comprise:
   a pulse width parameter; and
   a pulse shift parameter.

24. The system of claim 21, wherein the time delay technique comprises a multi-stage 2-input NAND gate delay circuit.

25. A system for optical recording, comprising:
   means for writing data onto an optical recording media; and
   means for controlling the writing means, comprising:
      means for performing a timing adjustment in a coarse increment to a write control signal using a clock with a cycle less than T, wherein T is a fundamental unit of time for data mark, and
      means for performing a timing adjustment in a fine increment to the write control signal using a time delay technique, and wherein the controlling means further comprises:
   a host interface;
   a buffer manager coupled to the host interface;
   an embedded memory coupled to the buffer manager;
   an integrated encoding/decoding engine coupled to the buffer manager;
   a data channel interface coupled to the integrated encoding/engine; and
   an integrated servo/recording processor coupled to the integrated encoding/decoding engine and the data channel interface, wherein the integrated servo/recording processor comprises a set of write strategies.

* * * * *